US008657119B2

(12) United States Patent
Wolf et al.

(10) Patent No.: US 8,657,119 B2
(45) Date of Patent: Feb. 25, 2014

(54) SEGMENTED MEDIA PUBLISHING SYSTEM

(76) Inventors: Scott D. Wolf, Newport News, VA (US); Bryan Allan White, Newport News, VA (US); Hugh Parker Spain, Yorktown, VA (US); Bryan S. Carrington, Norfolk, VA (US)

(*) Notice: Subject to any disclaimer, the term of this patent is extended or adjusted under 35 U.S.C. 154(b) by 1148 days.

(21) Appl. No.: 11/306,595

(22) Filed: Jan. 4, 2006

(65) Prior Publication Data

US 2008/0281917 A1 Nov. 13, 2008

(51) Int. Cl.
*G06F 15/16* (2006.01)
*G06Q 50/00* (2012.01)
*G06Q 40/00* (2012.01)

(52) U.S. Cl.
USPC ............ 209/206; 709/206; 709/217; 726/27; 726/33; 705/3; 705/35

(58) Field of Classification Search
USPC ................................ 709/204–207
See application file for complete search history.

(56) References Cited

U.S. PATENT DOCUMENTS

| | | | |
|---|---|---|---|
| 6,519,766 B1* | 2/2003 | Barritz et al. | 717/130 |
| 7,136,899 B1* | 11/2006 | Campailla | 709/206 |
| 7,379,851 B2* | 5/2008 | Koizumi et al. | 702/189 |
| 7,562,397 B1* | 7/2009 | Mithal et al. | 726/33 |
| 2003/0182420 A1* | 9/2003 | Jones et al. | 709/224 |
| 2006/0178910 A1* | 8/2006 | Eisenberger et al. | 705/3 |

FOREIGN PATENT DOCUMENTS

JP 2005115952 A * 4/2005

OTHER PUBLICATIONS

Luciano Bononi et al; Performance Analysis of a Parallel and Distributed Simulation Framework for Large Scale Wireless Systems; 2004 ACM 1-58113-953-5/04/0010; 52-61.*

* cited by examiner

*Primary Examiner* — Evans Desrosiers
(74) *Attorney, Agent, or Firm* — Philip H. Stevenson; P.H. Stevenson, PLC

(57) ABSTRACT

A system and method of publishing digital media content works is provided in which an individual content work is divided into multiple segments, and when a subscriber initiates a subscription to the content work, each individual content work segment is published via email to the subscriber on a fixed periodic basis until either the work is completely published or the subscriber terminates the subscription. The subscriber may interactively access the segments of the digital media content work via directly accessing the publication website or via an embedded link in the published segment. During interactive access, the subscriber may update subscription control data controlling segment publication so that the next segment published to the subscriber will be the next successive segment after the segment being accessed interactively. A table of unique book positions is maintained to control segment publication and thereby avoid excess accesses to underlying subscription data for a subscriber. The subscription control data and book position data is recorded independently of segment positions to enable modification of segment boundaries data while assuring subscriber receipt of the entirety of the segmented digital media content work.

17 Claims, 8 Drawing Sheets

300

And besides, how could anyone escape from these rooms?

"How can it benefit anyone if harm should happen to me?"

He thought of the tumult, the great social trouble of which he was so unaccountably the axis. A text, irrelevant enough and yet curiously insistent, came floating up out of the darkness of his memory. This also a Council had said:

"It is expedient for us that one man should die for the people."

301 [Prev] [Next] [All]

Printer Friendly Version | Send this page to a friend | Search for at Amazon™

Update or start your subscription for this book!

If you are already subscribed to the book, this form will simply reset your subscription so that you will receive the next segment by email.

If you are starting a new subscription you will need to confirm your request by following the steps in the confirmation email you will receive.

Note: Your subscription will start from the next section of this book! If you would like to begin receiving this book from the first section, check below.

Enter your email address:

302 [            ]   ⊙ Start from next section   ○ Start from section 1

[Subscribe]

Suggestions or a problem? Submit Feedback

Figure 3

Subscription control data 400

| | 402 | 403 | 404 | 405 | 406 |
|---|---|---|---|---|---|
| 401 | $posid_1$ | $bookid_1$ | $startdate_1$ | $enddate_1$ | $nextline_1$ |
| | $posid_2$ | $bookid_2$ | $startdate_2$ | $enddate_2$ | $nextline_2$ |
| | ... | ... | ... | ... | ... |
| | $posid_n$ | $bookid_n$ | $startdate_n$ | $enddate_n$ | $nextline_n$ |

Segment list for a book 407

| | 409 | 410 | 411 |
|---|---|---|---|
| 408 | $segment_1$ | $startpos_1$ | $endpos_1$ |
| | $segment_2$ | $startpos_2$ | $endpos_2$ |
| | ... | ... | ... |
| | $segment_s$ | $startpos_s$ | $endpos_s$ |

Figure 4

Initial segment list for a book

| segment$_{1,1}$ | startpos$_{1,1}$ | endpos$_{1,1}$ |
|---|---|---|
| segment$_{2,1}$ | startpos$_{2,1}$ | endpos$_{2,1}$ |

501 — 502 / 503 / 504 — 500

| segment$_{s1}$ | startpos$_{s1}$ | endpos$_{s1}$ |
|---|---|---|

Edited segment list for a book

506

| segment$_{1,2}$ | startpos$_{1,2}$ | endpos$_{1,2}$ |
|---|---|---|
| segment$_{2,2}$ | startpos$_{2,2}$ | endpos$_{2,2}$ |

507 — 508 / 509 / 510

| segment$_{s2}$ | startpos$_{s2}$ | endpos$_{s2}$ |
|---|---|---|

Figure 5

SEGMENTED MEDIA PUBLISHING SYSTEM

FIELD OF THE INVENTION

The invention relates to the field of publishing media using networked computers, in which a server or servers provide content to client systems, and particularly relates to the iterative publication of segments of a segmented media work, specifically a book, via email in which subscribers may also interactively access segments of the book directly and update the subscription to reflect this access.

BACKGROUND OF THE INVENTION

The Internet has allowed for the growth of many systems and methods for delivering information to different users of the inter-connected devices and computers. One form of data delivery that has seen tremendous growth is the delivery of user requested information from a variety of sources. This user requested information can be delivered via email or a browser based system.

In user requested information delivery systems referred to as ezines, content may be provided to the user via email. The provided email may contain a variety of formatting controls, such as HTML code, that provide a formatted document that gives the user subscribing to the ezine service the content in a formatted manner that is easy to read and analogous to print media. Such formatting can also allow for the delivery of a variety of marketing and advertising content which depend on the information rich nature the Internet and the high interactivity of these systems to provide additional and novel functions that ultimately generate the revenues that support the service the subscriber receives.

A significant disadvantage of current email delivered ezines is that the user has only approximate control over the content delivered. The content delivered may not be to the user's interests. Also, the user has little control over the size of the content. While a variety of methods may be used to control the allowable size of content delivered to a subscriber, such methods are typically implemented by aspects of the software and systems the subscriber uses, as opposed to the content publisher, potentially conflicting with the ability to provide the entire desired content.

Content publishers may conform the size of their content to allow for efficient delivery and to be generally suitable to user requirements; nonetheless, the ezine publisher still controls the ezine with respect to size. Additional aspects of the ezine remain within the publisher's control and outside the control of the subscriber. Such control would include the nature and origin of the content provided irrespective of any advertising content. Regardless of the tailoring of editorial content and limitations of subject matter content, the content is still ultimately outside of the direct control of the ezine subscriber, except as a matter of termination of the ezine subscription. Also, no available service provides a large digital media content work, such a book, within the limitations of email and similar services, that provides for user control of the publication that are responsive to the user's varying content delivery requirements and desires.

SUMMARY OF THE INVENTION

It is a an object of the present invention to provide users with a method for controlling the nature and delivery of ezine digital media content so that only a specific segment of a specifically desired entire media content work is provided at a given time. It is also an object of the invention to provide a means of allowing a publisher to prevent excessive memory usage by segmenting a larger media content work into smaller segments which will be delivered to a subscriber. It is a further object of the invention to allow a subscriber to select the content to be delivered. Another object of the invention is to provide a user with only a limited amount of content in the form of a segment of the larger digital media content work in order to conform to daily constraints on the amount of time a user may devote to enjoying the entire media content work.

Another object is to allow for a user to modify delivery control information to repeat an earlier provided segment of the entire work, or to advance the control information to publish next a segment beyond the work segment immediately sequential to the most recently delivered segment.

Another object of the invention is to allow a subscriber receiving segments of the content work to access the next segment and subsequent segments without waiting for delivery of those segments. An additional object of the invention is to allow for updating of the subscription delivery control data to advance segment delivery to the next unread segment if a subscriber directly accesses additional segments. Another object of the invention is to provide a means of interactively determining the next segment for delivery via providing a segment content sample to the user.

A further object of the invention is to provide an efficient means of segmenting a digital media content work for use with a subscription delivery service permitting interactive access of segments, and the segmenting of the digital media content work may be modified such that sequential delivery of the entirety of the media content work is still realized without maintaining segment specific information for a subscriber's subscription to a particular segmented work. Another efficiency realized with this invention is the implementation of an efficient process for validating subscription changes which does not require multiple challenge and opt-in iterations while preserving essential security.

A system for communicating a segmented digital media content work between interconnected networked computer systems, is provided which consists of a subscription server, configured to receive publication subscription information from a publication service subscriber. The subscription server stores the publication subscription information. The publication subscription information includes both publication subscriber account data, and publication subscription control data (SCData). The subscription server responsive to the publication subscription information causes a media server, which may be the same server, to transmit segmented digital media content work (sDMCWork) on a scheduled basis to the service subscriber.

The SCData indicates a current segment of the sDMCWork to be transmitted, and the publication subscriber account data associated with the SCData provides the network delivery address for the segment of the sDMCWork. The sDMCWork is a unitary digital media content work (DMCWork) which has been subdivided into a plurality of segments, with the segments as a group composing the entirety of the unitary DMCWork. Each of the segments is composed of a contiguous length of said DMCWork indicated by a start position and an end position within the unitary DMCWork. The subscription server updates said SCData upon transmission of said current sDMCWork segment so that said SCData indicate the next sequential segment of said sDMCWork.

The subscription server may update the SCData to change the current segment of the sDMCWork for transmission responsive to the service subscriber accessing a segment of said sDMCWork and indicating that the segment indicated in SCData should change.

The SCData may further be defined as including a position in a DMCWork that is independent of the segmenting of the DMCWork for determining the current segment of the DMCWork to be transmitted. The segmenting of the DMCWork constitutes a sequential series of nonoverlapping begin and end positions in the DMCWork to produce a unique segmentation of the sDMCWork. The subscription server will cause the media server to transmit the segment of said sDMCWork that includes the position stored in the SCData.

The SCData may further include an indicator of a subscription start date when said media server will first transmit a segment of the sDMCWork. The SCData further may include an indicator of an end date, the end date being the last date on which said media server will transmit the segment indicated in said SCData. The end date may only be recorded when the position of the SCData indicates that the segment of the sDMCWork to be transmitted is the final segment.

Other objects, advantages, features and aspects of the present invention will be apparent from the accompanying drawings and detailed description.

BRIEF DESCRIPTION OF THE DRAWINGS

The accompanying drawings incorporated in and forming a part of the specification, illustrate several aspects of the present invention, and together with the detailed description serve to explain the principles of the invention with reference to a preferred embodiment. In the drawings:

FIG. 3 is an example of an implementation of controls for a subscriber to interactively update a subscription;

FIG. 4 illustrates data structures which implement subscription control data and administer the segment list for a given book, showing that an intermediate table can store all information and the appropriate entry into the table is an identifier that thereby indicates all the parameters of the particular subscription by indicating an entry in the table;

FIG. 5 shows effect of editing a segment list for a given book, showing that the segment table for a media work may be changed;

DETAILED DESCRIPTION

Figure 1:
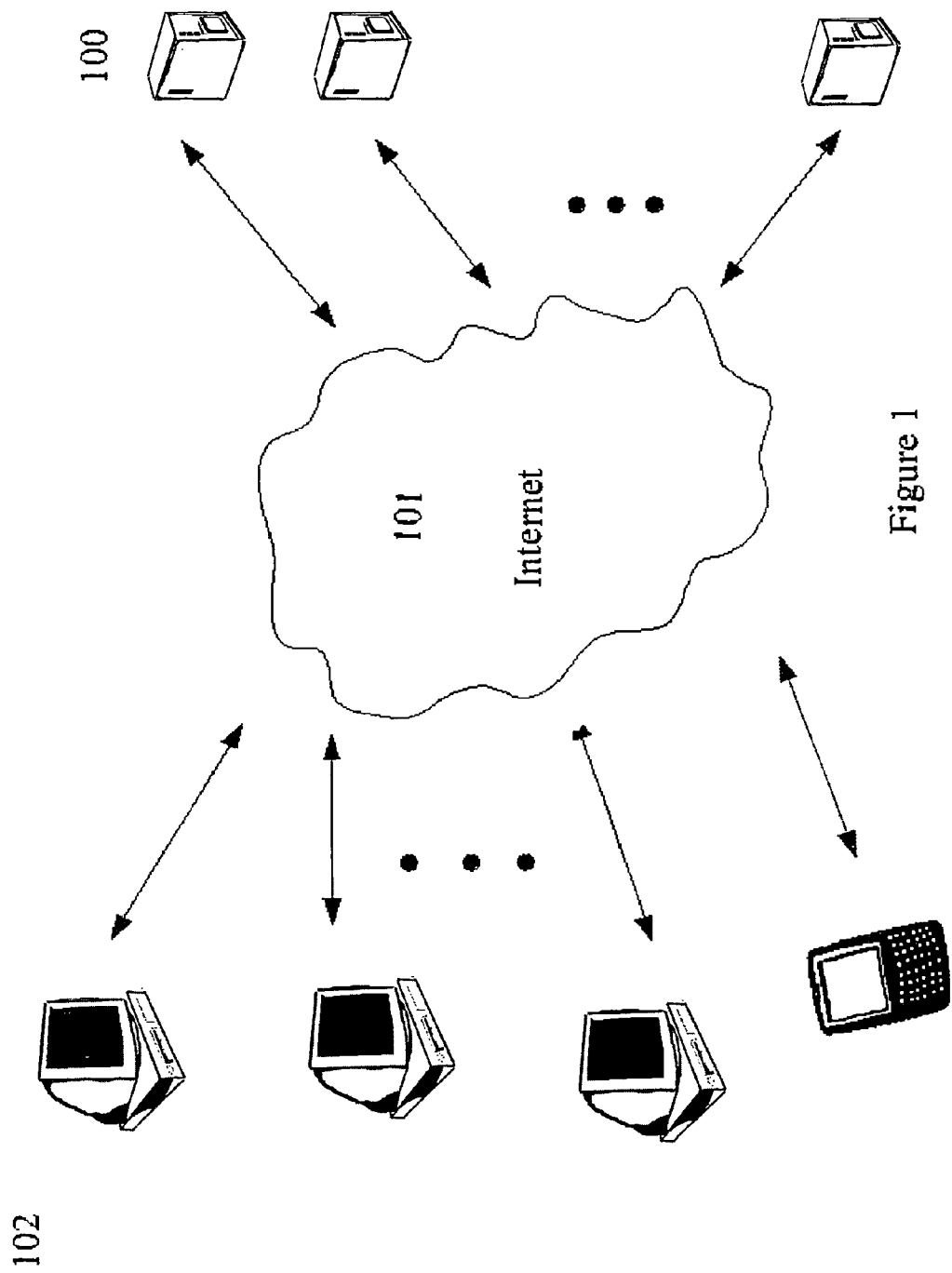
FIG. 1 shows generalized relationship of client computers/devices and server computers interconnected via the Internet.
Figure 2:
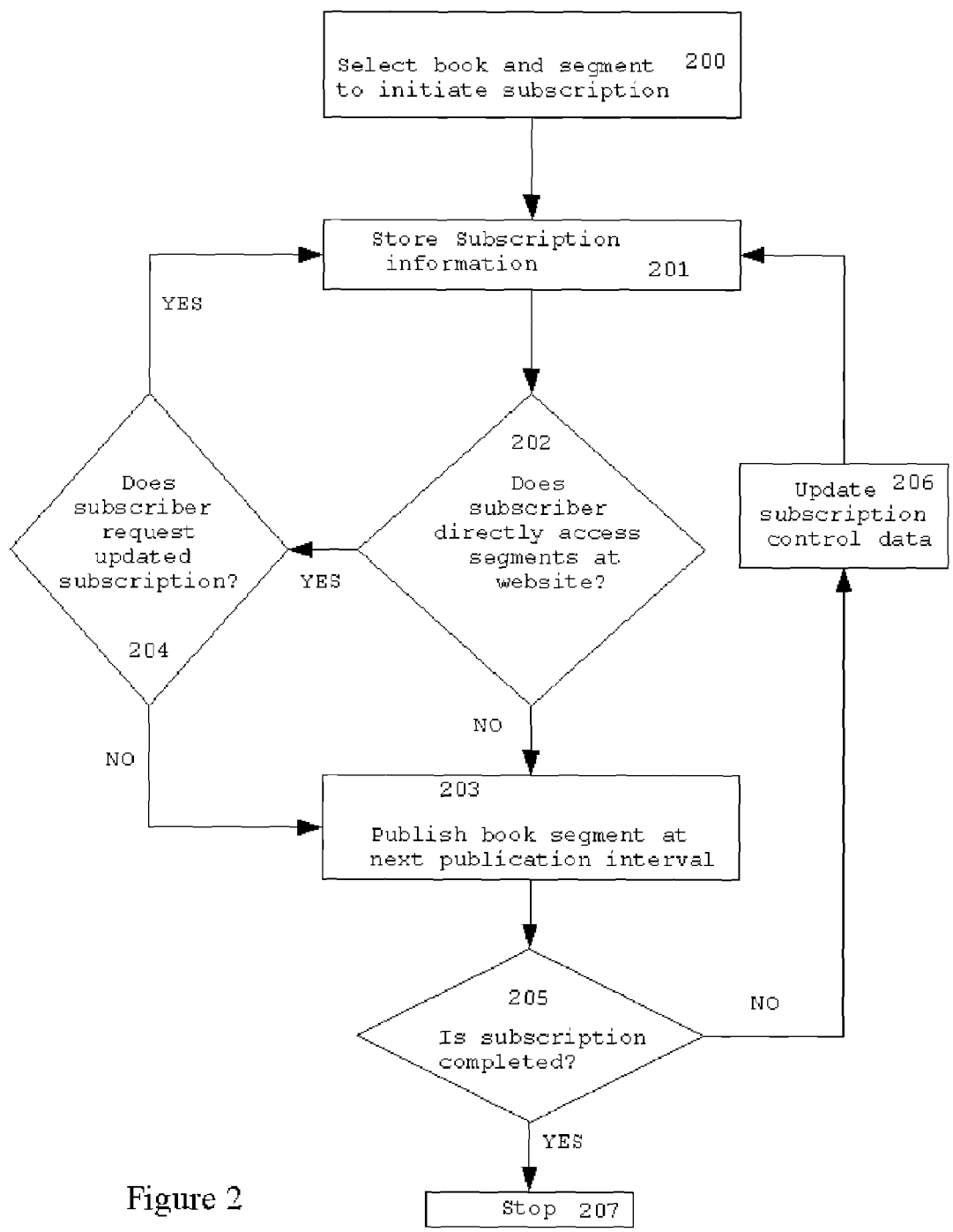
FIG. 2 is a flow chart describing the basic processes implemented in the system and method of the present invention, showing the general process flow.

FIG. 1 shows a preferred embodiment of the system for providing access to a segmented digital work. The subscription server (100) is connected via a network such as the Internet (101) which allows client systems (102) operated by subscribers to access the subscription server. Many servers and client systems may be interconnected. While multiple servers can be used to implement the system, in a preferred embodiment the subscription server and the media server are the same server (101).

While this invention many be obvious to have more general applicability, the digital media content work that the invention works best with initially is a text file. The text file that comprises a book is the basic unit upon which the system will work in publishing to a subscriber.

The subscriber enters subscription information (200) which is received by the subscription server and stored. This subscriber information will include both the subscriber account information and subscription control data. This information is stored by the subscription server (201).

In initially storing the data, the subscription server will create the control data (201) necessary to begin publishing segments of the book. Once the control data is created, the system can act responsively to the subscriber's further interaction. If the user does not directly access segments from the server (202), the server will publish the next segment via email to the subscriber. (203)

The subscriber may directly access segments of the book to which they subscribe at the website associated with the subscription server (202). The subscriber may access segments with or without updating the subscription (204). If the subscriber reads a segment of the book to which they are subscribed and wish to update the subscription, the user indicates so, and control flow will return to storing the subscription control data appropriately (201), and the process re-iterates. When the next segment publication time is reached, the segment that is published to the user will be the segment recorded as updated by the subscriber.

Once the segment is published (203), the system will test if the subscription is over (205). If it is, the subscription terminates (206). If not, the subscription is updated by advancing the control data to publish the next segment. (207). The process then returns to the beginning of the publication cycle in which the system stores the control data which is set for publication of the next segment, and the server waits for either the publication time cycle to elapse or for subscriber access to update the subscription information.

When directly accessing a segment of the book, the subscriber is provided with a webpage that includes the accessed segment of the book (300). The subscriber is provided with controls provided at the website of the server. The webpage controls allow for the subscriber to continue to access additional segments (301). If the subscriber chooses, the subscription can be updated by using the interactive controls provided on the webpage (302).

While other implementations may store the book information directly with the subscriber account data when the subscription information is first stored, in the preferred implementation the subscriber account data is not directly tied to the book that the subscriber has chosen. The subscription control data (400) is indirectly tied to the book via an intermediate data structure that is in the form of a list or table consisting of individual position records (401).

A position record consists of fields posid (402) which represent the position identifier of a current subscription to a particular book, bookid (403) which is the identifier of the book to be subscribed to, startdate (404) is a date field recording the date on which the subscription will begin, enddate (405) is a date field recording the date on which the subscription will end, and nextline (406) which indicates a line of text in the book which is the starting place of the next segment at the time that the system last updated this subscription.

There are many position records stored in the server system. By using the position record, many subscribers may share the data for a given current subscription to a given book when these user's are subscribing to the same segment of the work. This will reduce the load on the system as the individual subscription account data does not need to be accessed and updated for each subscriber after each publication cycle. Only the position record requires updating; the subscription account data will indirectly point to the correct segment via the position record fields. The position record field in the preferred implementation providing the correct information is the nextline field.

When a subscriber updates their own subscription independently of other subscribers, the system will find if there is a position record that reflects the current desired position of the subscriber. The subscription control data for the subscriber will be changed to that position record. If no position record exists that satisfies the combination of book and segment, a new position record is created which can now be used by other subscribers.

The segment list for a book (407) also represents an important aspect of the preferred embodiment. The segment list provides the media server with the information that was used to extract the segment from the original file in order to publish the segment to the subscriber. The segment table includes a series of records (408) with a segment field (409), a field startpos (410) for the starting position of the segment and a field endpos (411) for the ending position of the segment. While the book may exist as a segmented work, the segment table performs the important function of allowing for administrative changes to the segment without a subscriber being interrupted. The nextline field of the position record that indicates the current subscription of a subscriber is the actual field used to determine which segment to publish. The nextline field is compared to the startpos and endpos fields in order to select the segment recorded in the segment field as the desired next segment for publication. The startpos and endpos fields themselves may be used directly or indexed to file positions for extracting segments from the book for publishing.

The segment table is important as it allows the system to be updated during operations with no service interruption to the subscribers. An initial set of segments for a work (500) will represent the segments as configured at time 1, with a total of s1 segments present. If for any reason, the administrators of the media server require to edit the segments, a new edited segment list (506) will be produced at time 2.

It should be readily seen that the second segment in the edited table may have different startpos and endpos values in the book being published. The book may even have a different total number of segments, denoted s2, in the edited segment table.

As subscriptions are controlled by the position record, the nextline field value will result in a segment always being chosen such that a subscriber will always receive the entirety of the work. While some overlap of content in successively published segments is possible after editing a segment table, the subscriber is assured of receiving the entire work.

Figure 6:
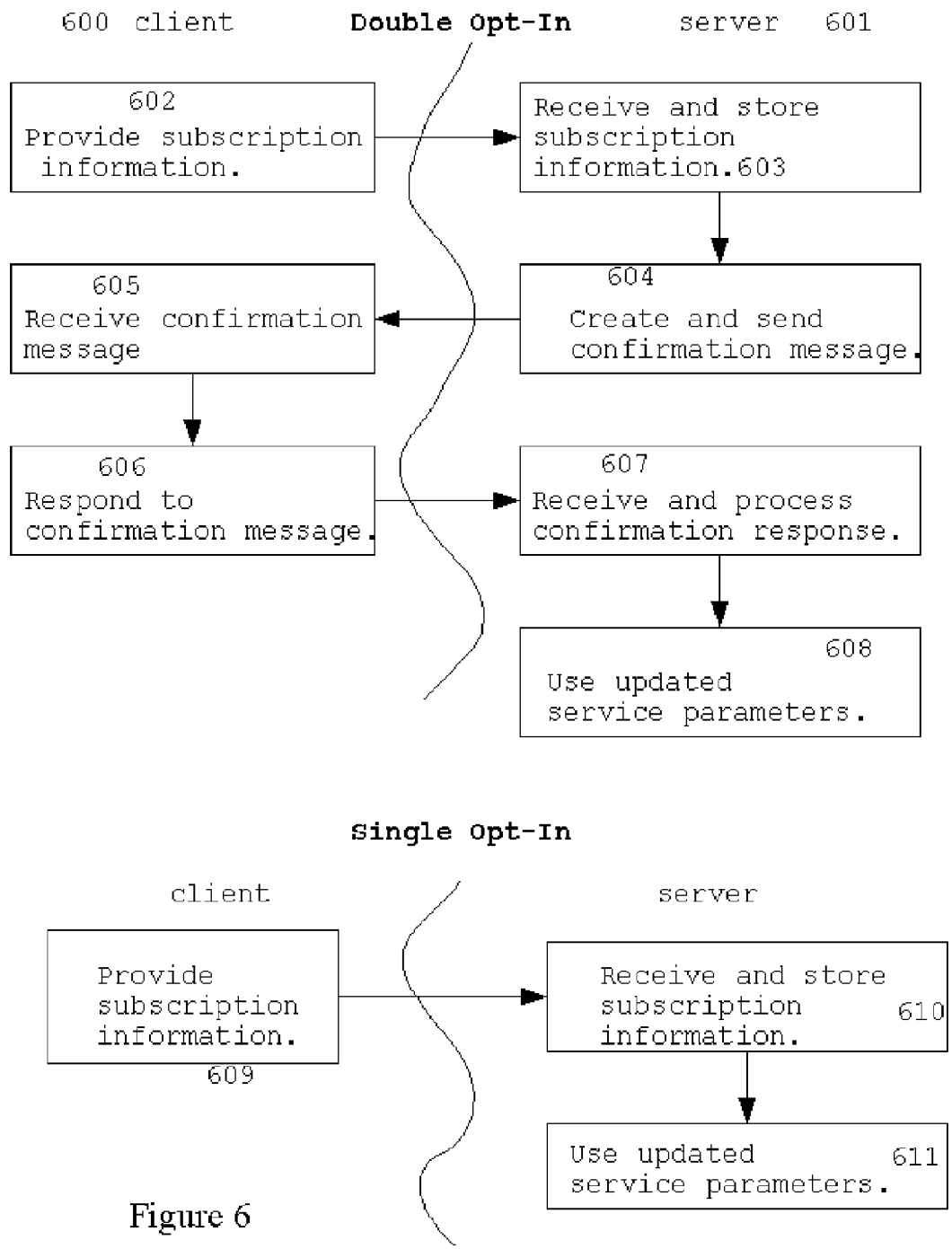
FIG. 6 depicts double opt-in flow control versus single opt-in flow control.
Figure 7:
FIG. 7 is an exemplary segment list as initially presented to browser at the website.
Figure 8:
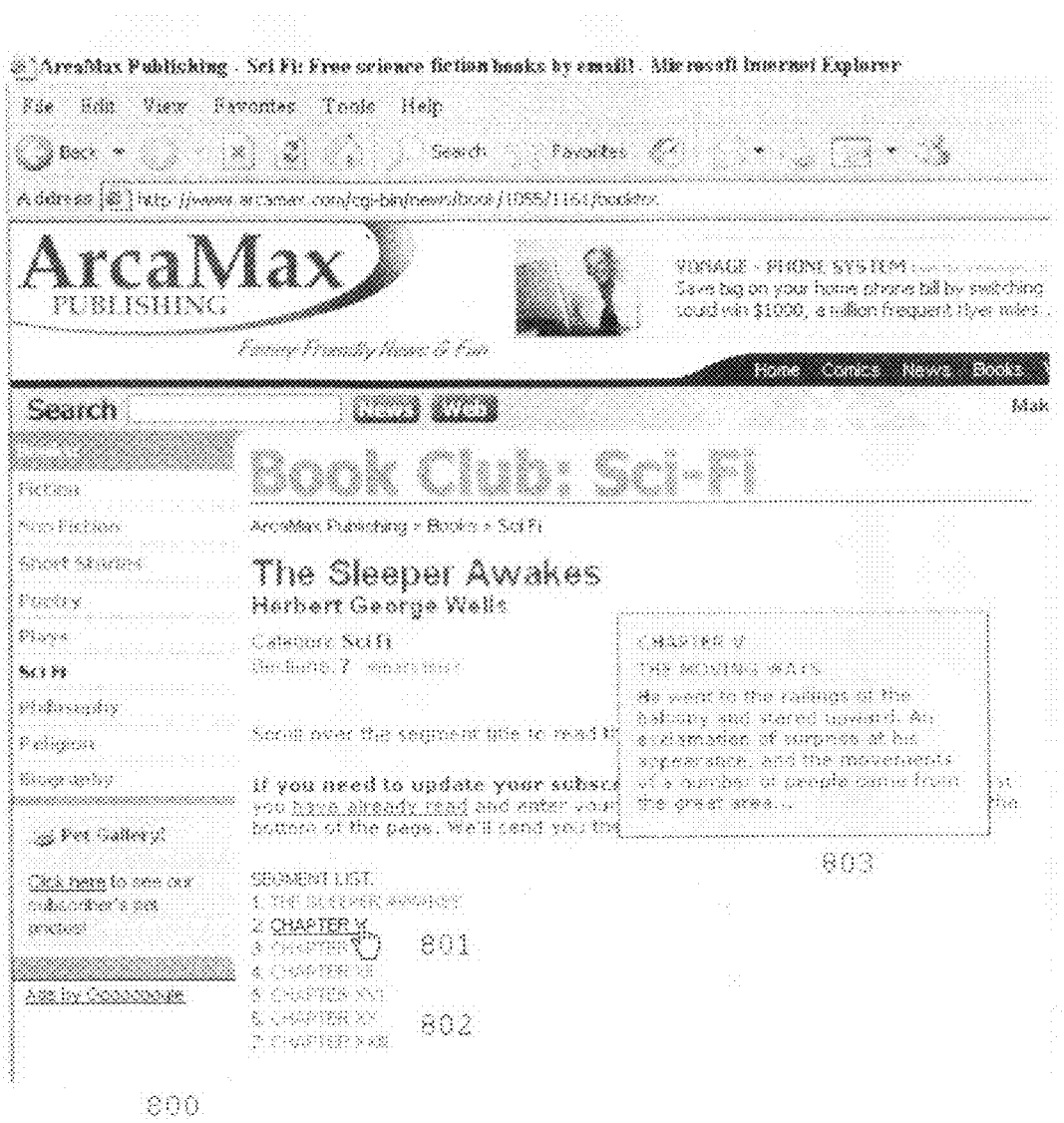
FIG. 8 depicts segment list of FIG. 7 once a mouse-over occurs and dynamic header text cueing displayed.

Another aspect of the invention that provides for improved efficiency is the use of single opt-in process. (FIG. 6). The standard account access method of the internet today is a double opt-in process. Here the user, in this case a subscriber operates a client system (600) connected to the server system (601) via the internet. The subscriber provides inputs information on the client system (602) which is transferred across the internet to the server. The server processes the susbcriber's request information (603); however, most systems do not allow immediate updating of subscriber or other client user account information on the server. Due to the possibility of malicious users trying to access the server system, the server composes a confirmation message which is sent to the subscriber/client user (604).

The client user is required to receive the confirmation message (605) and to respond appropriately (606), which causes the server to receive and process the confirmation response (607). Once the confirmation is processed the service parameters, which would here be subscription information, are updated appropriately. It is readily apparent that this situation creates additional accesses between the server and client.

In a single opt-in system, the user/subscriber would provides information in the client system (609) which is transferred to the server system. The server system receives and processes the updated information (610), which in the preferred embodiment is subscription information. The stored and updated service parameters are now used (610) to effect the desired result, here publication of the appropriate segment of a book.

The single-opt in system allows for efficient updating of subscription data since the requirements of a double opt-in system are avoided. One reason that the double-opt in system can be safely used in these circumstances is that the consequences of malicious access are minor. As opposed to changing financial information or allowing access to it, the only item being accessed is the subscription information. The initial subscription is still processed via a double opt-in process; however, the updating of the system (204) can be done via the efficient single opt-in method. The publication of a segment once per publication cycle, typically once daily, creates no opportunities for malicious access to create security issues for either the server or client side of the service.

Another aspect of the preferred implementation is the provision of an interactive system that provides contextual hints to a user of the segments that may be accessed. A subscriber who directly access the segments of the book, may be provided with a page in the browser (700) which includes a list of segments (702) that are accessible. In the initially accessed stage, the normal cursor (701) indicates that no hyper-linked segment titles in the segment list are being accessed yet. This would be the typical pre-selection view of a segment list.

Once the user causes the cursor to contact the segment titles of the segment list, the browser view changes (800). While the majority of the feature on the page are the same, the cursor changes to the information style cursor that is typical of interaction with a hyperlink. In this instance the list of segment titles (802) remains the same. The change is the provision on the page of the contextual information of the particular segment that the cursor interacts with as a separate text element on the page (803). Here, this contextual information provides the user with the introductory text of the particular segment. Selecting the segment would cause that book segment to then be provided to the user.

It is envisioned that the segment text which appears on the page would be provided from the server only as requested by the user, but cached once displayed. Such a method thereby allows for the maximal flexibility in providing the text live from the server while simultaneously avoiding the transfer of unnecessary information. Such would be the case if all segment introductory text data were provided on the request to display a segment title table of any given book.

The foregoing description of a preferred embodiment of the invention has been presented for purposes of illustration and description. It is not intended to be exhaustive or to limit the invention to the precise form described. Obvious modifications or variations are possible in light of the teaching of the provided description. This embodiment was chosen and described in order to best illustrate the principles of the invention and its practical application to thereby enable one of ordinary skill in the art to best utilize the invention in various embodiments and with various modifications as are suited to the particular use contemplated. It is intended that the scope of the invention be defined by the claims appended hereto.

What is claimed is:

1. A system including a server with a processor and a memory for communicating a segmented digital media content work between interconnected networked computer systems, comprising: a subscription server, configured to receive publication subscription information interactively entered from a publication service subscriber, said subscription server causing said publication subscription information to be stored, said publication subscription information comprises publication subscriber account data, and publication subscription control data (SCData), said subscription server, responsive to said publication subscription information, causing a media server to transmit segmented digital media content work on a scheduled basis to said service subscriber, said SCData of said publication subscription information further indicating a particular segmented digital media content work (sDMCWork) to be transmitted, said SCData further indicating a current segment of said sDMCWork to be transmitted, said publication subscriber account data associated with said SCData recording the network delivery method of said segment of said sDMCWork, in which said sDMCWork comprises a unitary digital media content work (DMCWork) which has been subdivided into a plurality of segments and further comprises readable text with said scheduled basis of transmission comprising an interval sufficient to read said text between transmissions, and said DMCWork further comprises a digital representation of an integrated body of content initially created as a unitary and complete body of content wherein said initially created body of content is content sequentially related in a single directed sequence from a beginning of said body of content to an end of said body of content, said plurality of segments comprise the entirety of said unitary DMCWork with said digital representation of said initially created body of content requiting a plurality of segments to completely contain said representation, and each of said segments comprises a contiguous length of said DMCWork indicated by a start position and an end position within said unitary DMCWork, said start position and said end position within said unitary DMCWork being related to each other identically as said directed sequence of said initially created body of content relates the respective content elements of said body of content to each other, and said subscription server updates said SCData upon transmission of said current sDMCWork segment so that said SCData indicate the next sequential segment of said sDMCWork.

2. The system of claim 1 further comprising:
said subscription server and said media server are the same server.

3. The system of claim 1 or claim 2 further comprising
said subscription server updates the SCData to change the current segment of the sDMCWork for transmission responsive to said service subscriber interactively accessing a segment of said sDMCWork and indicating said segment indicated in said SCData should change.

4. The system of claim 3 further comprising:
said SCData comprises an indicator of a position in said DMCWork that is independent of the segmenting of the DMCWork;
said segmenting constitutes a sequential series of nonoverlapping begin and end positions in the DMCWork to produce a unique segmentation of said DMCWork that is said sDMCWork, and
said subscription serve will cause said media server to transmit the segment of said sDMCWork that includes said position in said SCData.

5. The system of claim 4 further comprising:
said SCData further comprises an indicator of a subscription start date when said media server will first transmit said segment of said sDMCWork.

6. The system of claim 3 further comprising:
said SCData further comprises an indicator of a subscription start date when said media server will first transmit said segment of said sDMCWork.

7. The system of claim 5 further comprising
said SCData further comprises an indicator of an end date, said end date being the last date on which said media server will transmit said segment indicated in said SCData, said end date only recorded when said position of said SCData indicates that said segment of said sDMCWork is the final segment.

8. The system of claim 6 further comprising
said SCData further comprises an indicator of an end date, said end date being the last date on which said media server will transmit said segment indicated in said SCData, said end date only recorded when said position of said SCData indicates that said segment of said sDMCWork is the final segment.

9. A method of transmitting a segment of a segmented digital media content work in an interconnected computer network with a subscription server,
receiving in a subscription server publication subscription information interactively entered from a publication service subscriber,
storing said publication subscription information on said subscription server,
said publication subscription information comprises publication subscriber account data,
and publication subscription control data (SCData),
causing a media server responsive to said publication subscription information to transmit segmented digital media content work on a scheduled basis to said service subscriber,
said SCData of said publication subscription information further indicating a particular segmented digital media content work (sDMCWork) to be transmitted,
said SCData further indicating a current segment of said sDMCWork to be transmitted,
said publication subscriber account data associated with said SCData recording the network delivery method of said segment of said sDMCWork,
in which said sDMCWork comprises a unitary digital media content work (DMCWork) which has been subdivided into a plurality of segments and further comprises readable text with said scheduled basis of transmission comprising an interval sufficient to read said text between transmissions,
said DMCWork further comprises a digital representation of an integrated body of content initially created as a unitary and complete body of content wherein said initially created body of content is content sequentially related in a single directed sequence from a beginning of said body of content to an end of said body of content,
said plurality of segments comprise the entirety of said unitary DMCWork with said digital representation of said initially created body of content requiring a plurality of segments to completely contain said representation, and each of said segments comprises a contiguous length of said DMCWork indicated by a start position and an end position within said unitary DMCWork, said start position and said end position within said unitary DMCWork being related to each other identically as said directed sequence of said initially created body of content relates the respective content elements of said body of content to each other and updating said SCData stored in said subscription server upon transmission of said current sDMCWork segment so that said SCData indicate the next sequential segment of said sDMCWork.

10. The method of claim 9 further comprising:
said subscription server and said media server are the same server.

11. The method of claim 9 or claim 10 further comprising:
updating the SCData stored by said subscription server to change the current segment of the sDMCWork for transmission responsive to said service subscriber interactively accessing a segment of said sDMCWork and indicating said segment indicated in said SCData should change.

12. The method of claim 11 further comprising:
said SCData comprises an indicator of a position in said DMCWork that is independent of the segmenting of the DMCWork;
said segmenting constitutes a sequential series of nonoverlapping begin and end positions in the DMCWork to produce a unique segmentation of said DMCWork that is said sDMCWork, and said subscription server will cause said media server to transmit the segment of said sDMCWork that includes said position in said SCData.

13. The method of claim 10 further comprising:
said SCData further comprises an indicator of a subscription start date when said media server will first transmit said segment of said sDMCWork.

14. The method of claim 12 further comprising:
said SCData further comprises an indicator of a subscription start date when said media server will first transmit said segment of said sDMCWork.

15. The method of claim 13 further comprising
said SCData further comprises an indicator of an end date, said end date being the last date on which said media server will transmit said segment indicated in said SCData, said end date only recorded when said position of said SCData indicates that said segment of said sDMCWork is the final segment.

16. The method of claim 14 further comprising
said SCData further comprises an indicator of an end date, said end date being the last date on which said media server will transmit said segment indicated in said SCData, said end date only recorded when said position of said SCData indicates that said segment of said sDMCWork is the final segment.

17. The method of claim 9 in which said sDMCWork is stored as a text file or each segment of said sDMCWork is a text file.

* * * * *